United States Patent
Karunakaran et al.

(10) Patent No.: US 9,651,189 B2
(45) Date of Patent: May 16, 2017

(54) CURED-IN PLACE PIPE REHABILITATION PROCESS

(75) Inventors: Krishnan Karunakaran, Lake Jackson, TX (US); Rajesh H. Turakhia, Lake Jackson, TX (US)

(73) Assignee: BLUE CUBE IP LLC, Midland, MI (US)

( * ) Notice: Subject to any disclaimer, the term of this patent is extended or adjusted under 35 U.S.C. 154(b) by 525 days.

(21) Appl. No.: 14/123,412

(22) PCT Filed: Jun. 22, 2012

(86) PCT No.: PCT/US2012/043730
§ 371 (c)(1),
(2), (4) Date: Dec. 2, 2013

(87) PCT Pub. No.: WO2013/009452
PCT Pub. Date: Jan. 17, 2013

(65) Prior Publication Data
US 2014/0109980 A1 Apr. 24, 2014

Related U.S. Application Data

(60) Provisional application No. 61/505,573, filed on Jul. 8, 2011.

(51) Int. Cl.
*F16L 55/165* (2006.01)
*B29C 63/00* (2006.01)
(Continued)

(52) U.S. Cl.
CPC ...... *F16L 55/1651* (2013.01); *B29C 63/0017* (2013.01); *B29C 63/34* (2013.01);
(Continued)

(58) Field of Classification Search
None
See application file for complete search history.

(56) References Cited

U.S. PATENT DOCUMENTS

| | | | |
|---|---|---|---|
| 3,508,946 A * | 4/1970 | Plueddemann | B05D 1/24 138/145 |
| 3,949,125 A | 4/1976 | Roberts | |

(Continued)

FOREIGN PATENT DOCUMENTS

| | | |
|---|---|---|
| JP | 3281224 B2 | 5/2002 |
| JP | 2003236934 A | 8/2003 |

(Continued)

OTHER PUBLICATIONS

PCT/US2012/043730, International Search Report, Written Opinion of the international Searching Authority, Oct. 4, 2012.
(Continued)

*Primary Examiner* — Stella Yi
(74) *Attorney, Agent, or Firm* — Polsinelli PC

(57) ABSTRACT

The invention relates to a process comprising: (a) preparing a curable epoxy-anhydride thermoset composition; and (b) applying said curable epoxy-anhydride thermoset composition in a cured-in-place pipe rehabilitation process is disclosed. The cured-in-place pipe application utilized can generally be the 'Inversion Installation Method,' or the 'Pull-in Installation Method'. The invention also relates to a cured-in-place pipe that is prepared by this process.

13 Claims, 4 Drawing Sheets

(51) Int. Cl.
  *B29C 63/34* (2006.01)
  *E03F 5/02* (2006.01)
  *E03F 5/06* (2006.01)
  *B29K 63/00* (2006.01)
  *B29C 63/36* (2006.01)
  *E03F 3/06* (2006.01)

(52) U.S. Cl.
  CPC .............. *E03F 5/025* (2013.01); *E03F 5/06* (2013.01); *F16L 55/165* (2013.01); *F16L 55/1656* (2013.01); *B29C 63/0021* (2013.01); *B29C 63/36* (2013.01); *B29K 2063/00* (2013.01); *E03F 2003/065* (2013.01); *Y10T 137/0441* (2015.04)

(56) References Cited

U.S. PATENT DOCUMENTS

| | | | |
|---|---|---|---|
| 4,060,655 A | 11/1977 | Johannes et al. | |
| 4,845,234 A | 7/1989 | Schneider et al. | |
| 5,879,501 A | 3/1999 | Livingston | |
| 5,925,409 A * | 7/1999 | Nava | B29C 63/34 427/238 |
| 6,692,802 B1 | 2/2004 | Nava | |
| 7,238,251 B1 | 7/2007 | Driver et al. | |
| 7,360,559 B2 | 4/2008 | Driver et al. | |
| 7,374,127 B2 | 5/2008 | Gallagher et al. | |
| 7,766,048 B2 | 8/2010 | Driver et al. | |
| 2006/0108016 A1* | 5/2006 | Funatsu | B29C 63/486 138/141 |
| 2007/0004841 A1 | 1/2007 | Gosselin | |
| 2009/0136661 A1 | 5/2009 | Hakansson | |
| 2010/0029879 A1 | 2/2010 | Gosselin | |
| 2010/0292415 A1* | 11/2010 | Reynolds | C08G 59/24 525/533 |

FOREIGN PATENT DOCUMENTS

| | | |
|---|---|---|
| JP | 2004161814 A | 6/2004 |
| JP | 2004331939 A | 11/2004 |
| WO | 92/20504 A1 | 11/1992 |

OTHER PUBLICATIONS

PCT/ US2012/04730, International Preliminary Report on Patentability, Jan. 23, 2014.

* cited by examiner

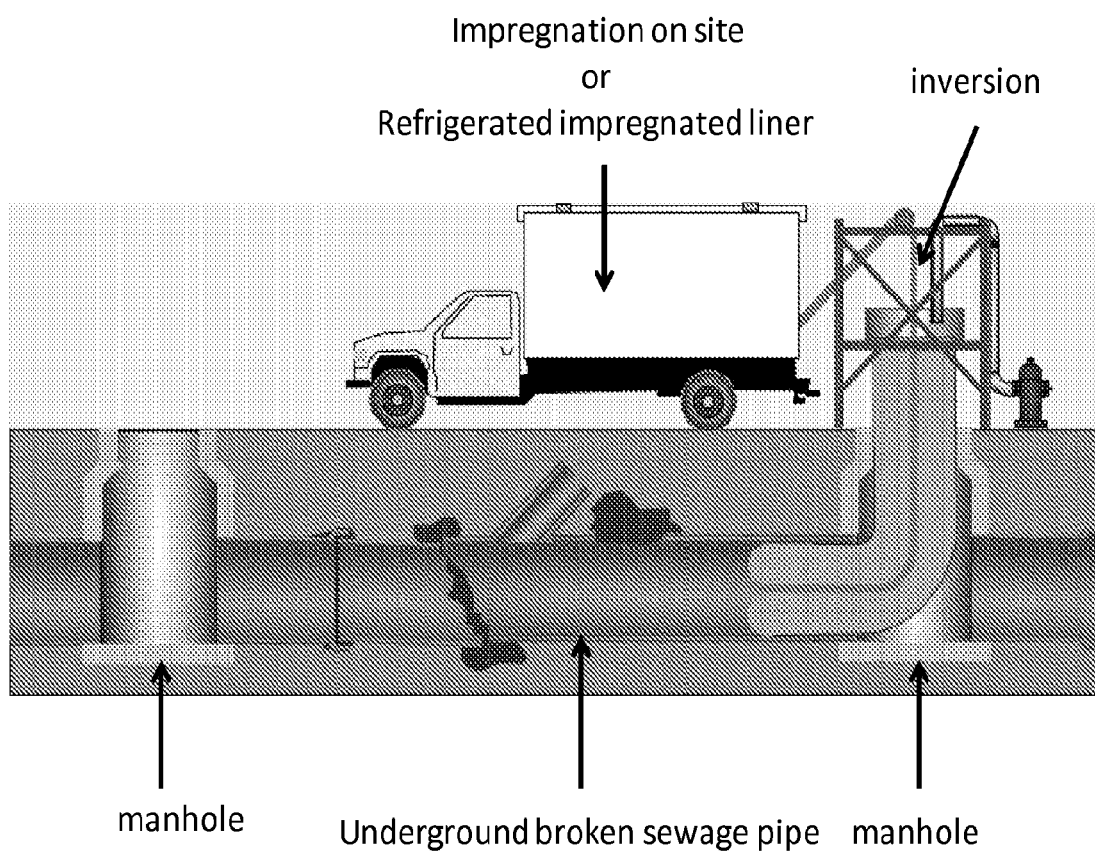
Figure 1: Inversion Installation Method
(ASTM F1216)

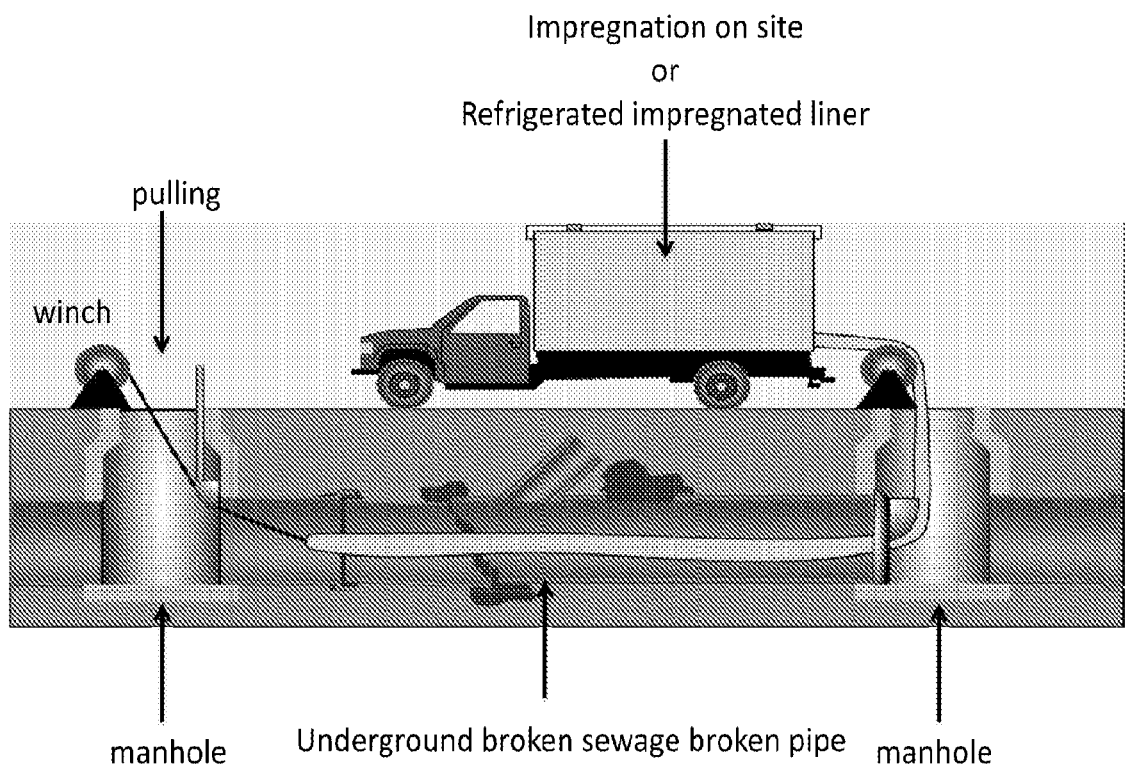
Figure 2: Pull-in Installation Method (ASTM F1743)

Figure 3: Viscosity Growth vs. Time Plot
Epoxy-Anhydride Thermoset System at 25C
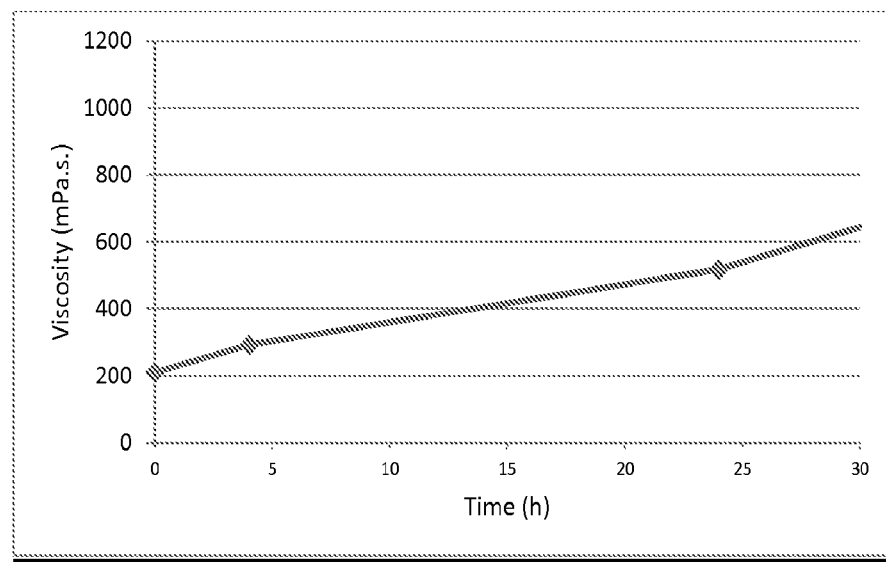
Figure 4: Reactivity of Epoxy-Anhydride system at 80°C
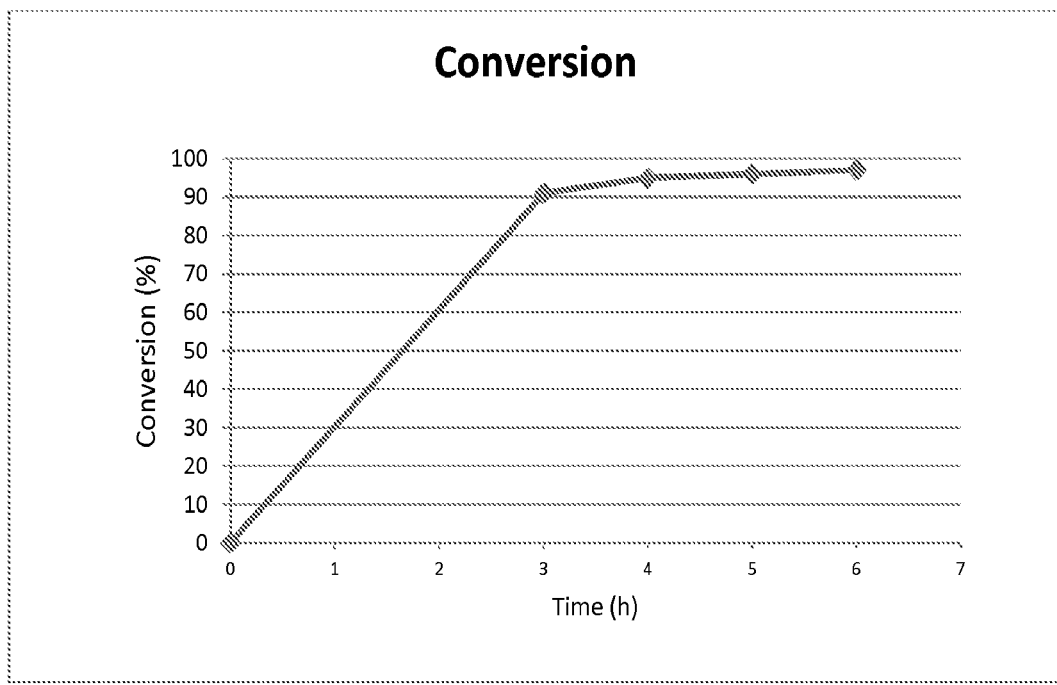

Figure 5: Viscosity Growth vs. Time Plot
Epoxy-Amine Thermoset System at 25°C
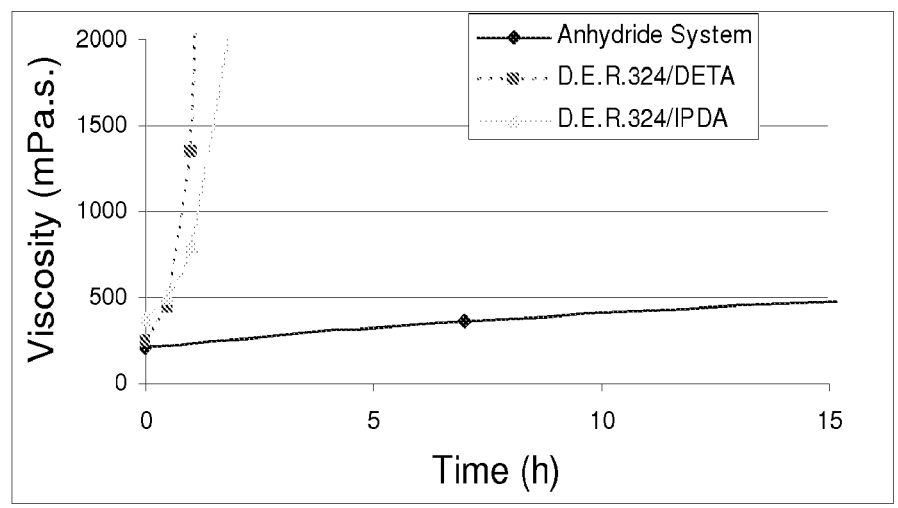

CURED-IN PLACE PIPE REHABILITATION PROCESS

REFERENCE TO RELATED APPLICATIONS

This application is a non-provisional application claiming priority from the U.S. Provisional Patent Application No. 61/505,573, filed on Jul. 8, 2011, entitled "CURED-IN PLACE PIPE REHABILITATION PROCESS" the teachings of which are incorporated by reference herein, as if reproduced in full hereinbelow.

BACKGROUND OF THE INVENTION

Field of the Invention

The present invention is related to a novel cured-in-place pipe (CIPP) process utilizing a curable epoxy-anhydride thermoset system.

Description of Background and Related Art

Underground sewer pipes, potable water pipes, and other pipes fracture with use and age. Repair of these leaking and damaged pipes is time consuming and expensive as it involves excavation and replacement of these damaged pipes. Cured-in-place pipe (CIPP) technology was first utilized in the United Kingdom in 1971, and introduced to the North American market in the late 1970's. Over the next 20 years this technology revolutionized the sewer pipeline repair industry, providing a reliable solution to rehabilitating sewer pipelines without the need to excavate. There are two used processes for cured-in-place pipe applications: "Inversion Installation Method" and "Pull-in Installation Method". The most common is the "Inversion Installation Method" and the process involves impregnating a flexible non-woven felt liner with the curable thermoset composition, followed by inverting the impregnated non-woven felt liner into an existing (host) pipe, and curing of the impregnated felt liner within the host pipe. The CIPP process is classified as rehabilitation or renovation because it forms a new hard inner pipe within and adhering to the existing host pipe.

There are three types of thermoset systems commonly used for this application:
  Polyester—commonly used in sewer applications,
  Vinyl ester—used in severe duty, industrial and special waste applications, and
  Epoxy-amine thermosets—commonly used in potable water and pressure pipe applications.

The traditional polyester system remains the lower cost workhorse of the industry. Although epoxy resins have been used to protect and repair all types of infrastructure for the past 75 years, their use in underground rehabilitation was limited due to handling constraints (a relatively shorter pot-life) and high cost. Although epoxy-amine thermoset systems are superior to polyesters for properties like shrinkage, adhesion, no presence of solvents like styrene, mechanical properties, and chemical resistance, their main draw-back is the shorter pot-life which makes it difficult to work in CIPP applications. Epoxy-amine thermosets have therefore been generally reserved for limited use in high end applications like aggressive municipal and industrial wastewater applications.

Pot-life is a measure of the working time in minutes during which the felt liner in a cured-in-place application can be impregnated with a thermoset resin system, inverted, and cured properly in the host pipe. A good pot-life for a successful CIPP application is greater than 5 hours. Polyesters and vinyl ester thermosets can manage this pot-life. Epoxy-amine thermosets can barely meet this requirement as their pot-life ranges from 30 minutes to barely 5 hours and sometimes under special conditions such as keeping it at a cooler temperature. Therefore, an epoxy thermoset system with a longer pot-life would be useful and desired for CIPP applications.

SUMMARY OF THE INVENTION

In an embodiment of the invention, there is disclosed a process comprising, consisting of, or consisting essentially of:
  (a) preparing a curable epoxy-anhydride thermoset composition; and
  (b) applying said curable epoxy-anhydride thermoset composition in a cured-in-place pipe rehabilitation process.

The cured-in-place pipe application can generally be the 'Inversion Installation Method,' or the 'Pull-in Installation Method'.

BRIEF DESCRIPTION OF THE DRAWINGS

For the purpose of illustrating the present invention, the drawings show a form of the present invention which is presently preferred. However, it should be understood that the present invention is not limited to the precise arrangements and instrumentation shown in the drawings.

FIG. 1 is a schematic diagram of "Inversion Installation Method" for cured-in-place pipe application process.

FIG. 2 is a schematic diagram of "Pull-in Installation Method" for cured-in-place pipe application process.

FIG. 3 is a graphical illustration showing viscosity growth versus time of the epoxy-anhydride thermoset system at 25° C. of one embodiment of the present invention.

FIG. 4 is a graphical illustration showing reactivity of the epoxy-anhydride thermoset system at 80° C. of one embodiment of the present invention.

FIG. 5 is a graphical illustration showing viscosity growth versus time at 25° C. of the epoxy-amine thermoset system of one embodiment of the present invention. The graphic illustration in this figure also has a comparison plot of the epoxy-anhydride thermoset system.

DETAILED DESCRIPTION OF THE INVENTION

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the present invention is not limited to the specific embodiments described below, but rather; the invention includes all alternatives, modifications, and equivalents falling within the true scope of the appended claims.

Unless otherwise stated, a reference to a compound or a component includes the compound or component by itself, as well as in combination with other compounds or components, such as mixtures or combinations of compounds.

As used herein, the singular forms "a," "an," and "the" include the plural reference unless the context clearly dictates otherwise.

In an embodiment, the present invention comprises, consists of, or consists essentially of (a) preparing a curable epoxy-anhydride thermoset composition (b) applying said curable epoxy-anhydride thermoset composition in a cured-in-place pipe process.

Pot-life is the working time from the point when component A, epoxy resin and component B, hardener of a thermosetting system are mixed together to the point when the resulting formulation is no longer usable. Pot-life or an end of a pot-life is often defined as the point at which the viscosity increases significantly due to the reaction between component A, epoxy resin and component B, hardener. The high viscosity will make it difficult to successfully complete the CIPP process.

Epoxy Anhydride Thermoset Composition

Epoxy Resins

Epoxy resins suitable for the epoxy-anhydride thermoset composition include but are not limited to the diglycidyl ethers of the following compounds: resorcinol, catechol, hydroquinone, bisphenol A, bisphenol AP (1,1-bis(4-hydroxylphenyl)-1-phenyl ethane), bisphenol F, and bisphenol K, tetrabromobisphenol A, phenol-formaldehyde novolac resins, alkyl substituted phenol-formaldehyde resins, and any combination thereof. Examples of particular epoxy compounds useful in the present invention include a diglycidyl ether of bisphenol A sold by The Dow Chemical Company under the trademark D.E.R.™ 383; Other examples of the epoxy resin include but are not limited to for example the following: D.E.R.™ 383, D.E.R.™ 331, D.E.R.™ 332, D.E.R.™ 354, and divinylbenzene diepoxide (DVBDO). In additional embodiments, polyepoxide compounds include epoxy novolacs, such as D.E.N.™ 431 or D.E.N.™ 438 (trademarks of The Dow Chemical Company).

The epoxy resin optionally can contain a minor amount of a reactive diluent. The diluents should have more than an average of about one reactive group per molecule. Suitable reactive diluents include D.E.R.™ 736, D.E.R.™ 732, cresyl glycidyl ether, diglycidylether of aniline, alkyl $C_{12}$-$C_{14}$ mono alkylglycidyl ether 1,4-butanedioldiglycidylether, 1,6-hexanediol diglycidyl ether, 2-ethylhexylglycidyl ether, neopentlydiglycidyl ether, trimethylpropanetriglycidyl ether, and glycidyl ether of carboxylic acids. Preferably the reactive diluents present within the range of 0.1 to about 25 weight percent based on the weight of epoxy resin.

In addition to the above epoxy resins and reactive diluents, other optional components such as polyols, thixotropes, toughening agents, surfactants, fillers, air release agents, pigments and mixtures thereof can be used. Toughening agents including but not limited to CTBN rubbers, amphiphilic block copolymers, block copolymers based on CRP from Arkema, and core-shell rubbers can also be used. Fillers including but not limited to fumed silica, clays, talc, silica, calcium carbonate, and wollostonite can also be used. The concentration of the optional components as one of the epoxy resin portions of the formulation may range generally from 0.1 wt % to about 20 wt % based on the weight of the epoxy resin.

All the components of the epoxy resin are typically mixed at a temperature enabling the preparation of an effective epoxy resin composition having the desired properties. The epoxy equivalent weight (EEW) of the epoxy resin and the optional components described above if used may range generally from about 130 to about 250 in one embodiment; from about 150 to about 225 in yet another embodiment; and from about 170 to about 220 in still another embodiment. The viscosity of the epoxy resin and optional components described above may generally range from about 200 to about 10,000 mPa·s in one embodiment; from about 300 to about 5000 mPa·s in yet another embodiment; and from about 400 to about 2000 mPa·s in still another embodiment.

Anhydride Curing Agent

In general the terms 'curing agent', 'hardener', and 'cross-linker' are used interchangeably by the thermoset industry. Anhydride curing agents suitable for the epoxy-anhydride thermoset composition include but are not limited to aromatic anhydrides, cycloaliphatic anhydrides, and aliphatic anhydrides. Examples include but not limited to nadic methyl anhydride, hexahydrophthalic anhydride, tetrahydrophthalic anhydride, methyl tetrahydrophthalic anhydride, methyl hexahydrophthalic anhydride, succinic anhydride, dodecenyl succinic anhydride, and their derivatives, and mixtures thereof. Generally, any anhydride hardener known in the art which is appropriate for curing epoxy resins may be used.

In addition to the above anhydrides, other optional components such as polyols, toughening agents, and mixtures thereof can be used. The concentration of the optional components used in the anhydride curing agent may range generally from about 0.1 wt % to about 50 wt % of the anhydride curing agent.

All the components of the epoxy resin are typically mixed at a temperature enabling the preparation of an effective anhydride curing agent having the desired properties. The viscosity of the anhydride curing agent and optional components described above may generally range from about 50 to about 5000 mPa·s in one embodiment; from about 60 to about 2000 mPa·s. in yet another embodiment; and from about 80 to about 1000 mPa·s in still another embodiment.

Catalyst

In an embodiment of the present invention, the epoxy-anhydride thermoset composition include a catalyst may be used in the present invention. Generally, any homogeneous or heterogeneous catalyst known in the art which is appropriate for facilitating the reaction between an epoxy resin and anhydride curing agent may be used. The catalyst may include for example, but are not limited to, imidazoles, tertiary amines, phosphonium complexes, quaternary ammonium salts, Lewis acids, or Lewis bases, transition metal catalysts, and mixtures thereof. Examples of particular catalysts useful in the present invention are benzyl dimethylamine (BDMA), 1-methylimidazole (1-MI), and benzyltriethylammonium chloride (BTEAc).

The concentration of the catalyst used in the epoxy-anhydride thermoset composition range generally from 0 wt % to about 7 wt % in one embodiment; from about 0.1 wt % to about 5 wt % in another embodiment; and from about 0.5 wt % to about 3 wt % in yet another embodiment. Optionally, the catalyst can be pre-dissolved in the anhydride and the epoxy-anhydride thermoset system can be made by mixing the epoxy resin and pre-catalyzed anhydride.

Application in a Cured-in-Place Pipe Process

The epoxy-anhydride thermoset composition is used in a cured-in-place pipe rehabilitation process. There are two process used for cured-in-place pipe application: "Inversion Installation Method" and "Pull-in Installation Method". The first process of lining the pipe is described in detail in method ASTM F 1216: "Standard practice for Rehabilitation of Existing Pipelines and Conduits by the Inversion and Curing of a Resin-Impregnated Tube," which is herein incorporated by reference. The second method of lining the pipe is described in detail in method ASTM F 1743: "Standard Practice for Rehabilitation of Existing Pipelines and Conduits by Pulled-in-Place Installation of Cured-in-Place Thermosetting Resin Pipe" or ASTM F2019: "Standard Practice for Rehabilitation of Existing Pipelines and Conduits by the Pulled-in-Place Installation of Glass Reinforced Plastic (GRP) Cured-in-Place Thermosetting Resin Pipe" (CIPP).

The epoxy-anhydride thermoset system of the present invention was evaluated by ASTM F1216: "Standard practice for Rehabilitation of Existing Pipelines and Conduits by the Inversion and Curing of a Resin-Impregnated Tube." This process includes impregnating a flexible non-woven felt liner with the curable epoxy-anhydride thermoset composition, inverting the impregnated flexible non-woven felt liner into a host pipe and curing the liner which is now in an existing pipe. The epoxy-anhydride thermoset composition useful for repair of pipes has to properly wet the liner. The liner is generally a laminate of non-woven felt coated with a plastic sheet material as a membrane. The liner can be non-woven felt or a fiber glass reinforced non-woven felt, or glass fiber reinforced liners. The non-woven felt liner is impregnated with an uncured epoxy-anhydride thermoset composition at room temperature. The felt liner thickness is generally in the range of from about 3 mm to about 25 mm. The infusion is generally done at room temperature between about 20° C. to about 30° C. The felt liner is stitched in cylindrical form (the shape of the host pipe) and is made to fit snugly in the host pipe. The diameter of the liner can be from about 3 inches to about 100 inches. The amount of the thermoset system used to infuse the felt liner depends on the host pipe diameter and the felt thickness. The general range for thermoset system usage is about 1 lb per linear foot to about 50 pound per linear foot. The impregnated liner is inverted inside out along the pipe using fluid pressure bringing the uncured thermoset epoxy-anhydride composition now in contact with the host pipe. When the thermoset composition is cured, the impregnated liner forms a rigid shell inside the host pipe resulting in a smooth new inner surface.

The Curing Process and Conditions

The process for preparing epoxy-anhydride composition or formulation of the present invention includes blending (a) an epoxy resin, (b) an anhydride hardener, and (c) a catalyst.

The curing of the formulation may be carried out at a predetermined temperature and for a predetermined period of time sufficient to cure the formulation. For example, the temperature of curing the formulation may be generally be in the range of from about 30° C. to about 150° C. in one embodiment; from about 40° C. to about 130° C. in another embodiment; and from about 50° C. to about 100° C. in yet another embodiment; and the curing time may be in the range of from about 30 minutes to about 12 hours in one embodiment, from about 30 minutes to about 8 hours in another embodiment, and from about 45 minutes to about 6 hours in yet another embodiment. The curing is usually done with hot water or high pressured steam.

The Cured-in-Place Pipe Product

There are minimum flexural modulus and flexural strength requirements for CIPP applications. The flexural properties are determined using method ASTM D 790. In some instances depending on the end use application, it is necessary for the cured specimen ability to withstand chemical reagents. The chemical resistance test is done following method ASTM D 543. The method evaluates change in weight and retention of flexural properties in the presence of chemical reagents.

EXAMPLES

Example 1 and Comparative Example A

Part A—Procedure for Preparing the Curable Composition

A curable epoxy-anhydride thermoset composition (Example 1) was made as follows:

An epoxy blend of D.E.R.™ 383, butanedioldiglycidyl ether (BDDGE), D.E.R.™ 732, and C12-C14 alkylglycidyl ether was made by mixing them at room temperature (Part A).

A pre-catalyzed anhydride hardener was made by dissolving benzyltriethylammonium chloride (BTEAc) in methyltetrahydrophthalic anhydride (MTHPA) by heating at 60° C. for 4 hours (Part B).

A comparable curable epoxy-amine thermoset composition (Example 1A) was made using a formulated epoxy resin and formulated amine hardener. The formulation details are shown in Table 1.

The curable composition was made by mixing Parts A and B at room temperature.

TABLE 1

Curable Compositions

| | Example 1 Weight % | Example 1A Weight % |
|---|---|---|
| Part A | | |
| D.E.R. 383 | 70 | |
| D.E.R. 736 | 15 | |
| 1,4-butanedioldiglycidyl ether | 7.5 | |
| C$_{12}$,C$_{14}$-alkyldiglycidyl ether | 7.5 | |
| D.E.R. 324 | | 100 |
| Part B | | |
| Methyl Terta hydrophthalic anhydride | 95-99.9 | |
| Benzyltriethylammonim acetate | 0.1-5 | |
| D.E.H. 20 | | 100 |
| Part A:Part B ratio | 55:45 | 90:10 |

The viscosity growth of the curable composition of the epoxy-anhydride thermoset system at 25° C. is shown in FIG. 3. There is minimal growth of viscosity at 25° C. indicating low reactivity and long pot-life up to 24 hours as shown in FIG. 3. The long pot-life at ambient temperature enables the epoxy-anhydride formulation to be stable for longer period of time enabling the insertion/inversion of the liner for larger diameter and longer pipes. As shown in FIG. 4, even with a long pot-life, the epoxy-anhydride system cured very well at 80° C. in less than 8 hours. As a comparative example, an epoxy-amine system has significant lower pot-life. FIG. 5 also has a viscosity growth plot for the epoxy-anhydride system for comparison purpose against the epoxy-amine system. The viscosity increases rapidly after 2-3 hours for the epoxy-amine thermoset system at room temperature indicating the key differences between the pot-life of epoxy-anhydride (long pot-life) thermoset system and epoxy-amine (short pot-life) thermoset system.

Part B—Procedure for Infusing, Inverting, and Curing the Liner

A method of infusing, inverting, and curing the liner was done as described in ASTM F 1216 method: Standard practice for Rehabilitation of Existing Pipelines and Conduits by the Inversion and Curing of a Resin Impregnated Tube.

Mechanical Properties

The mechanical properties are shown in Table 2. The data clearly meets the minimum requirements as referenced in ASTM F1216.

TABLE 2

Mechanical Properties

| Property | Test Method | Units | Value | Minimum Value* |
|---|---|---|---|---|
| Flexural Modulus | DIN EN ISO 178 | GPa | 3.7 | 1.7 |
| Flexural Strength | DIN EN ISP 178 | MPa | 99.7 | 31 |
| Tg | | °C. | 85 | |

*ASTM F1216

Chemical Resistance

The chemical resistance was done by the method described in ASTM F1216. Exposures were done for one month at 73.4° F. (23° C.) in the following compounds: 10% Sulfuric acid, 5% Nitric acid, 10% Phosphoric acid, Tap Water, Gasoline, Vegetable Oil, 0.1% Hand soap, and 0.1% Detergent. During this period, the CIPP test specimens should lose no more than 20% of their initial flexural strength and flexural modulus. The weight gain, tensile modulus, tensile strength, and the difference in these properties after one month of exposure to these chemicals are shown in Table 3. The data clearly meets the requirements of ASTM F1216.

TABLE 3

Chemical Resistance of Epoxy-Anhydride Thermoset

| Chemicals | Weight Gain % | Flexural Strength MPa | Flexural Strength Loss from Control (%) | Flexural Modulus GPa | Flexural Modulus Loss from Control (%) |
|---|---|---|---|---|---|
| Control | — | 133.5 | — | 3.4 | — |
| 10% Sulfuric acid | 0.7 | 123.4 | 7.6 | 2.9 | 16.5 |
| 5% Nitric acid | 0.7 | 136.4 | 0.0 | 3.6 | 0 |
| 10% Phosphoric acid | 0.7 | 128.7 | 3.6 | 3.2 | 8.2 |
| Tap Water | 0.7 | 127.4 | 4.6 | 3.1 | 9.9 |
| Gasoline | 1.0 | 129.9 | 0.0 | 3.2 | 7.7 |
| Vegatible Oil | 0.1 | 136.9 | 2.7 | 3.4 | 0 |
| 0.1% Hand Soap | 0.7 | 136.2 | 0.0 | 3.6 | 0 |
| 0.1% Detergent | 0.7 | 134.7 | 0.0 | 3.6 | 0 |

It will be obvious to persons skilled in the art that certain changes may be made in the methods described above without departing from the scope of the present invention. It is therefore intended that all matter herein disclosed be interpreted as illustrative only and not as limiting the scope of protection sought. Moreover, the process of the present invention is not to be limited by the specific examples set forth above including the tables to which they refer. Rather, these examples and the tables they refer to are illustrative of the process of the present invention.

What is claimed is:

1. A process comprising:
   (a) preparing a curable epoxy-anhydride thermoset composition comprising:
      (i) preparing a mixture comprising a diglycidyl ether of bisphenol A, 1,4-butanedioldiglycidyl ether (BDDGE), a reactive diluent, and a $C_{12}$-$C_{14}$ alkylglycidyl ether;
      (ii) dissolving benzyltriethylammonium chloride (BTEAc) in methyl tetra hydrophthalic anhydride (MTHPA); and
      (iii) mixing components (i) and (ii) at room temperature; and
   (b) applying the curable epoxy-anhydride thermoset composition in a cured-in-place pipe rehabilitation process; wherein the concentration of the catalyst is 0.1 wt % to 7 wt %; and
      wherein the curable epoxy-anhydride thermoset composition is cured at a temperature of from about 40° C. to about 130° C. for from about 30 minutes to about 12 hours.

2. The process of claim 1, wherein the cured-in-place pipe application comprises an 'Inversion Installation Method'.

3. The process of claim 1, wherein the cured-in-place pipe application comprises a 'Pull-in Installation Method'.

4. The process of claim 1, wherein the curable epoxy-anhydride thermoset composition has a pot-life of greater than about 3 hours at room temperature (about 25° C.).

5. The process of claim 1, wherein the curable epoxy-anhydride thermoset system composition has a pot-life in the range of from about 3 hours to about 36 hours at room temperature (about 25° C.).

6. The process of claim 1, wherein a pipe in the cured-in-place pipe process has a diameter of from about 6 inches to about 100 inches.

7. The process of claim 1, wherein the diglycidyl ether of bisphenol A has an EEW in the range of from about 130 to about 250.

8. The process of claim 1, wherein the diglycidyl ether of bisphenol A has a viscosity in the range of from about 200 mPa·s to about 10,000 mPa·s.

9. The process of claim 1, wherein the curable epoxy-anhydride thermoset composition further comprises an anhydride having a viscosity in the range of from about 50 mPa·s to about 1000 mPa·s.

10. The process of claim 1, wherein the curable epoxy-anhydride thermoset composition further comprises a toughening agent.

11. The process of claim 1, wherein the curable epoxy-anhydride thermoset composition further comprises a polyol.

12. The process of claim 1, wherein the curable epoxy-anhydride thermoset composition further comprises a compound selected from the group consisting of fumed silica, talc, clay, silica, and combinations thereof.

13. The process of claim 1, wherein the pipe in the cured-in-place pipe process is selected from the group consisting of a sewer pipe, potable water pipe, a high pressure pipe, and an industrial pipe.

* * * * *